United States Patent
Ramakrishnan et al.

(10) Patent No.: US 11,222,432 B2
(45) Date of Patent: Jan. 11, 2022

(54) OBJECT OF INTEREST TRACKING

(71) Applicant: International Business Machines Corporation, Armonk, NY (US)

(72) Inventors: Arun Ramakrishnan, Chennai (IN); Pramod KS, Hunsur (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 69 days.

(21) Appl. No.: 16/657,447

(22) Filed: Oct. 18, 2019

(65) Prior Publication Data

US 2021/0118155 A1    Apr. 22, 2021

(51) Int. Cl.
*G06T 9/00* (2006.01)
*G06T 7/292* (2017.01)
*G06K 9/00* (2006.01)

(52) U.S. Cl.
CPC .......... *G06T 7/292* (2017.01); *G06K 9/00624* (2013.01); *G06K 9/00979* (2013.01)

(58) Field of Classification Search
CPC . G06T 7/292; G06K 9/00624; G06K 9/00979
USPC ........................................................ 382/103
See application file for complete search history.

(56) References Cited

U.S. PATENT DOCUMENTS

| | | | | |
|---|---|---|---|---|
| 2005/0096084 A1* | 5/2005 | Pohja | ................ | G06Q 10/10 455/556.1 |
| 2006/0077255 A1* | 4/2006 | Cheng | ................ | G08B 13/1965 348/143 |
| 2007/0230744 A1* | 10/2007 | Dronge | ................ | G08B 13/194 382/103 |
| 2008/0285797 A1* | 11/2008 | Hammadou | ....... | G06K 9/00771 382/103 |
| 2009/0059002 A1* | 3/2009 | Kim | ................. | G08B 13/19645 348/143 |
| 2010/0134627 A1* | 6/2010 | Yen | ........................ | G06T 7/292 348/159 |
| 2014/0304271 A1* | 10/2014 | Lu | ............................ | G06T 7/90 707/740 |
| 2017/0270689 A1* | 9/2017 | Messely | ................. | G06T 7/246 |
| 2018/0033109 A1 | 2/2018 | Fund | | |
| 2018/0041736 A1* | 2/2018 | Gagnon | ................ | H04N 7/188 |
| 2018/0293875 A1 | 10/2018 | Heier | | |
| 2018/0309701 A1* | 10/2018 | Wang | ...................... | H04L 51/12 |
| 2019/0058849 A1 | 2/2019 | Watanabe | | |
| 2019/0147279 A1* | 5/2019 | Liu | .................... | G06K 9/00993 382/181 |
| 2019/0164246 A1 | 5/2019 | Ferranti | | |
| 2019/0171905 A1* | 6/2019 | Ye | ...................... | G06K 9/00201 |

* cited by examiner

*Primary Examiner* — Stephen P Coleman
(74) *Attorney, Agent, or Firm* — Fabian VanCott; Steven L. Nichols

(57) ABSTRACT

According to a computer-implemented method, multiple potential objects of interest are identified from a camera feed of a source camera. A number of adjacent cameras are identified along possible travel routes. For each adjacent camera, it is detected whether any of the multiple potential objects of interest are identified in an associated camera feed. For each adjacent camera whose feed does not include any potential object of interest, analysis of downstream camera feeds is prevented during tracking of the multiple potential objects of interest.

18 Claims, 9 Drawing Sheets

OBJECT OF INTEREST TRACKING

BACKGROUND

The present invention relates to object of interest tracking, and more specifically to the elimination of certain possible travel routes when cameras along those travel routes to not detect any of the potential objects of interest.

SUMMARY

According to an embodiment of the present invention, a computer-implemented method is described. According to the computer-implemented method, multiple potential objects of interest are identified from a camera feed of a source camera. A number of adjacent cameras along possible travel routes are identified. For each adjacent camera, it is detected whether any of the multiple potential objects of interest are identified in an associated camera feed. For each adjacent camera whose feed does not include any potential object of interest, analysis of downstream camera feeds during tracking of the multiple potential objects of interest is prevented.

The present specification also describes a system. The system includes an image recognition system, to, for camera feeds received from cameras in a network, identify potential objects of interest from associated camera feeds. A camera network analysis device of the system identifies, relative to a source camera, a number of adjacent cameras along possible travel routes. A feed analysis device of the system, for each adjacent camera, detects whether any of the multiple potential objects of interest are identified in an associated camera feed. The system also includes a route planning system to plot a likely route of the multiple objects of interest by preventing analysis from downstream camera feeds when an upstream camera does not include any potential object of interest.

The present specification also describes a computer program product for tracking an object of interest. The computer program product includes a computer readable storage medium having program instructions embodied therewith. The program instructions are executable by a processor, to cause the processor to identify multiple potential objects of interest from a camera feed of a source camera and identify by the processor, a number of adjacent cameras along possible travel routes. The program instructions also cause the processor to, for each adjacent camera, detect whether any of the multiple potential objects of interest are identified in an associated camera feed and for each adjacent camera whose feed does not include any potential object of interest, prevent analysis of downstream camera feeds during tracking of the multiple potential objects of interest. Similarly, the program instructions cause the processor to, for each adjacent camera whose feed does include a potential object of interest identify a second number of adjacent cameras. Then, for each of the second number of adjacent cameras, detect, by the processor, whether any of the multiple potential objects of interested are identified in an associated camera feed and for each of the second number of adjacent cameras whose feed does not include any potential object of interest, prevent analysis of downstream camera feeds to identify the multiple potential objects of interest. The program instructions also cause the processor to plot, by the processor, a likely route of the multiple objects of interest.

DETAILED DESCRIPTION

Figure 1:
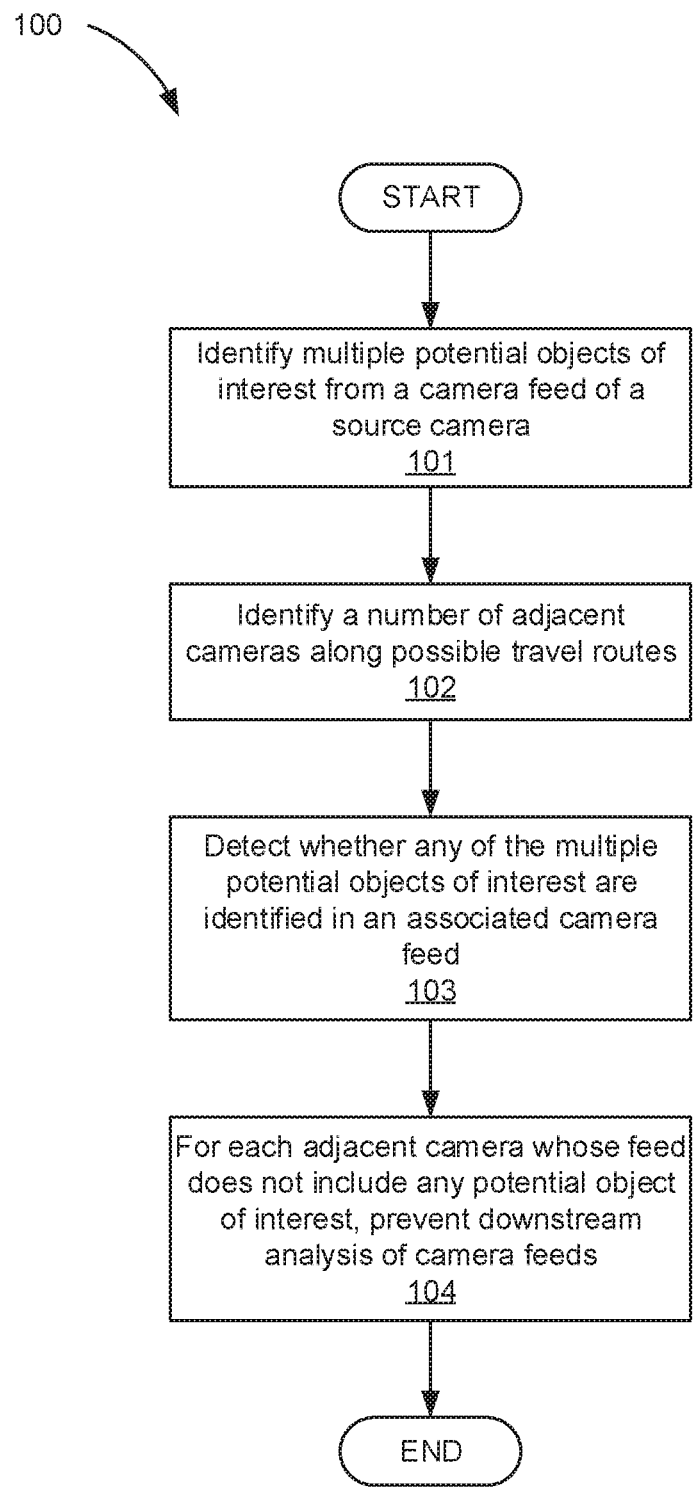
FIG. 1 depicts a flowchart of a method for tracking an object of interest, according to an example of principles described herein.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the uses computer, partly on the users computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As objects move through physical space it may be desirable to track their location. For example, it may be desirable to track the movement of a lost pet throughout a neighborhood. Doing so may allow for the perpetrator to be caught and to return property to the owner. In general, current tracking methods will fall into two categories. In the first, a tag may be associated with an object, such as a vehicle or person, being tracked. This may be done for example via a global positioning system (GPS) or similar transmitter, associated with the object. Of course, this method relies on a tag being associated with the object.

In another example, no such tag is available and object tracking may only generalize and isolate possible locations to search. This second method in particular relies on a far less deterministic approach of generalizing an area of search. Such a generalized search may be difficult and may not yield satisfactory search results. For example, it may be that a search team has identified general areas to search based on an elapsed time and follow leads through manual approaches. As time passes, the search area increases drastically. For example, a search radius may be 5 kilometers if within one hour of an initial report and expand to 10 kilometers within two hours of the initial report. As time goes on, the search radius exponentially expands. This makes object searching difficult and reduces the likelihood of success of finding objects or persons not attached with tracking technology such as GPS.

Accordingly, the present specification relates to the detection and tracking of objects from a known starting location. The present specification describes a method of efficiently tracking these "objects of interest".

Specifically, the present specification describes a method to determine possible routes a target may take and prune the scope of a search for the target over time. Specifically, cameras may be placed in public areas for a variety of reasons. As a specific example, traffic cameras may be placed to monitor traffic and security cameras may be placed to monitor activity outside or near a building. According to the present specification, object and facial recognition systems may be employed on images from these cameras to capture and locate a target. According to the present method, objects of interest such as faces or vehicles are identified on the cameras at a source. From the current location, adjacent locations that have cameras are identified such that the objects of interest may be identified at these adjacent locations. From collected video from the adjacent locations, the system looks for matching objects of interest. Locations that have no matches are dismissed. Through repeating this process, the system plots a route that an object of interest has taken from the source. As adjacent locations are analyzed, certain cameras that do not have feeds that include the objects of interest are dropped so as to hone in on a particular route or at least a smaller set of potential routes.

Such a system, method, and computer program product 1) allow projection of potential routes an object of interest may take from a location; 2) use a more deterministic approach over an expanding radius of possible locations; 3) can be initiated via a trigger such as an alarm or a manual trigger. For example, if an individual has a confirmed location of an object of interest at a particular time, then that location is used as a base location. The system, method, and computer program product also reduce the search scope by isolating next possible locations from a current location. In the case of multiple objects of interest are found at the starting location, the present system, method, and computer program product allow for the narrowing down of tracking efforts until one is identified as the particular object of interest.

As used in the present specification and in the appended claims, the term "a number of" or similar language is meant to be understood broadly as any positive number including 1 to infinity.

Turning now to the figures, FIG. 1 depicts a flowchart of a method (100) for tracking an object of interest, according to an example of principles described herein. As described above, such a method (100) projects and tracks the route of an identifiable object of interest, which may be a person, vehicle, or other trackable object. Specifically, the present method (100) optimizes the set of locations where a search is to be done. From an initial known location of an object, the next possible set of locations are projected. Locations for which it is improbable that an object of interest is found are eliminated from subsequent analysis. That, is, the present method (100) optimizes the set of areas to look for while analyzing data for objects of interest by carrying forward known objects of interest from the previous location and prioritizing search for these known objects first. As used in the present specification a target object of interest may be an individual, a vehicle, or any other object that can be visually tracked, such as an animal.

According to the method (100), multiple potential objects of interest are identified (block 101) from a camera feed of a source camera. The source camera may be near a known location of an object of interest and may be a starting point of object tracking. For example, an object of interest may be a vehicle leaving a particular store. A camera placed over the store parking lot may have a feed that captures images of the particular vehicle. In this example, the camera at the store parking lot may be the source camera. In addition to capturing the vehicle of interest, the source camera may capture other potential objects of interest, for example customers and other vehicles going into and out of the store and/or parking lot. Accordingly, the system of the present application may identify (block 101) these potential objects of interest.

Such identification (block 101) may include a variety of different mechanisms. For example, facial recognition systems may be able to distinguish between different people in a camera feed. As yet another example, tracking technologies may be able to identify and distinguish vehicle characteristics such as license plate numbers, colors, and types of vehicles. Such technologies may be used to distinguish and/or differentiate various potential objects of interest.

The method (100) also includes identifying (block 102) a number of adjacent cameras along possible travel routes. That is, as described above, within any geographic region there may be any number of cameras disposed along possible travel routes. Examples include security cameras placed around businesses and/or traffic cameras placed at intersections of roads.

The identification (block 102) of the adjacent cameras may be performed in any number of ways. In a first example, the adjacent cameras may be identified (block 102) by traversing paths to identify possible routes away from the source camera. For example, in the case of a vehicle or a person, that vehicle or person may travel along roadways. The system may include a database of those roadways as well as a database of cameras along those roadways. Accordingly, the system may virtually traverse the routes leading away from the source location and once a location is reached that has a camera positioned, this camera may be marked as an adjacent camera. In another example, an area of analysis may be evaluated to determine if there are any cameras within that area. If not, the radius is expanded away from a source camera until a camera, or a set of cameras is detected, which camera or set of cameras may be identified as adjacent cameras.

In yet another example, each camera may be aware of the next immediate locations. That is, the source camera itself may identify the number of adjacent cameras along possible travel routes. For example, information defining each camera and its relative position to other cameras may be programmed into each camera such that the source camera itself knows which cameras are nearest either in line of sight or via dedicated roadways/pathways. In other examples, such an identification (block 102) of adjacent cameras is performed off-site, for example, at a data server remote to the cameras.

For each adjacent camera, it is detected (block 103) whether any of the multiple potential objects of interest are identified in an associated camera feed. This may include comparing objects of interest identified in a source camera feed with objects of interest from an adjacent camera feed. For example, a source camera feed may identify vehicle A, vehicle B, and vehicle C, and individual 1, individual 2, and individual 3. A first camera feed may identify vehicle B, vehicle D, vehicle, E and individual 3, individual 4, and individual 5 while a second camera feed does not identify any of the potential objects of interest. The overlap of potential objects of interest for each feed indicates a direction of travel for the shared potential objects of interest. For example, from the source location, vehicle B and individual 2 followed a direction from the source camera to the first adjacent camera, while none of the potential objects of interest from the source camera made their way towards the second adjacent camera.

The adjacent camera feeds may be analyzed similar to the source camera feed for example, via facial recognition, vehicle licensing plate recognition, or any other form of image analysis. In one particular example where the source camera identifies the adjacent camera, the source camera may send a notification of identified potential objects of interest and data regarding the multiple potential objects of interest to the number of adjacent cameras. That is, data may be transmitted directly from the source camera to the adjacent cameras. In some examples, if the cameras have enough computing power, the cameras themselves may detect (block 103) a match between detected potential objects of interest. In other examples, the comparison of detected potential objects of interest may be done by sending video feeds to a server to perform the processing.

For each adjacent camera whose feed does not include any potential object of interest, analysis of downstream camera feeds is prevented (block 104). For example, as noted above, the second camera feed, which may be placed a few blocks away from the store location, may not have identified any of the potential objects of interest as identified in the source camera feed. Accordingly, it is ineffective to analyze cameras adjacent to this second camera as it is known that the target object of interest, nor any of the multiple potential objects of interest are in that area. Thus, the method (100) provides away to prune a search area to just those areas where a potential object of interest has been identified and by eliminating those areas where it is known that a potential object of interest is not found. Thus, the location and tracking of an object of interest is simpler and more effective, thus increasing the likelihood of finding a potential object of interest as it travels away from a source location.

A specific example is now provided, again in the context of a most pet, however as noted above, the method (100) as described herein may apply across a variety of scenarios. In this example, a time the pet became lost may be identified by either alarms or calls to emergency services. Based on the location associated with the pet, relevant, or source, cameras for the location are identified, which source cameras may be selected for being within a minimum distance of the location and for having a view towards the location. In some examples, a time window is established of a decided time before the event up until a decided time after the event. The source camera feed is analyzed for this time window to identify potential objects of interest associated with the lost pet, which objects of interest may be the pet itself.

Objects of interest are flagged with enough details to cross reference against instances of capture from other sources (e.g. cameras) of data. As described above, the next possible set of locations is identified starting from the current location. As described above, this may be done by following roads/pavements to identify all possible routes out of the current location to reach the first set of next locations or by expanding a radius until the next set of locations are reached. A particular location is identified as a point on a map within the view of one or more cameras. These may correspond to traffic junctions, public buildings, or other buildings, such as a bus station. At this point, a number of possible adjacent locations have been identified based on the possible routes from the starting location.

As with the source camera, camera feeds for these adjacent cameras are analyzed to identify objects of interest. As with the source camera, one or more objects of interest may be identified in these new locations. The intersection of the objects from the adjacent cameras and the objects from the source camera form a new set of objects of interest. Any location that has no matching objects of interest may be discarded. In some examples, certain objects of interest may be filtered. For examples, a bus passing by the location without stopping may be filtered from the potential objects of interest thus further optimizing the search.

For each of the remaining locations, the process is repeated, that is adjacent cameras are identified and those without matching objects of interest are discarded as are their downstream cameras. Through this process, the method (100) eliminates routes that have no matching objects of interest and just those routes that have captured one of the objects of interest are retained.

Using map routing and travel estimation, a system can estimate how far along each of the possible routes someone may reach using various forms of transportation such as walking, bicycle, car, bus etc. Such a method (100) provides a great help to agencies or users to track and pursue different objects of interest such as people, animals, and/or vehicles from a known location. Moreover, such a system improves the functionality of a computing device by performing facial recognition or other methods of visual analysis on a subset of potential data, i.e., just those cameras for which it is known that an object of interest passed by.

Figure 2:
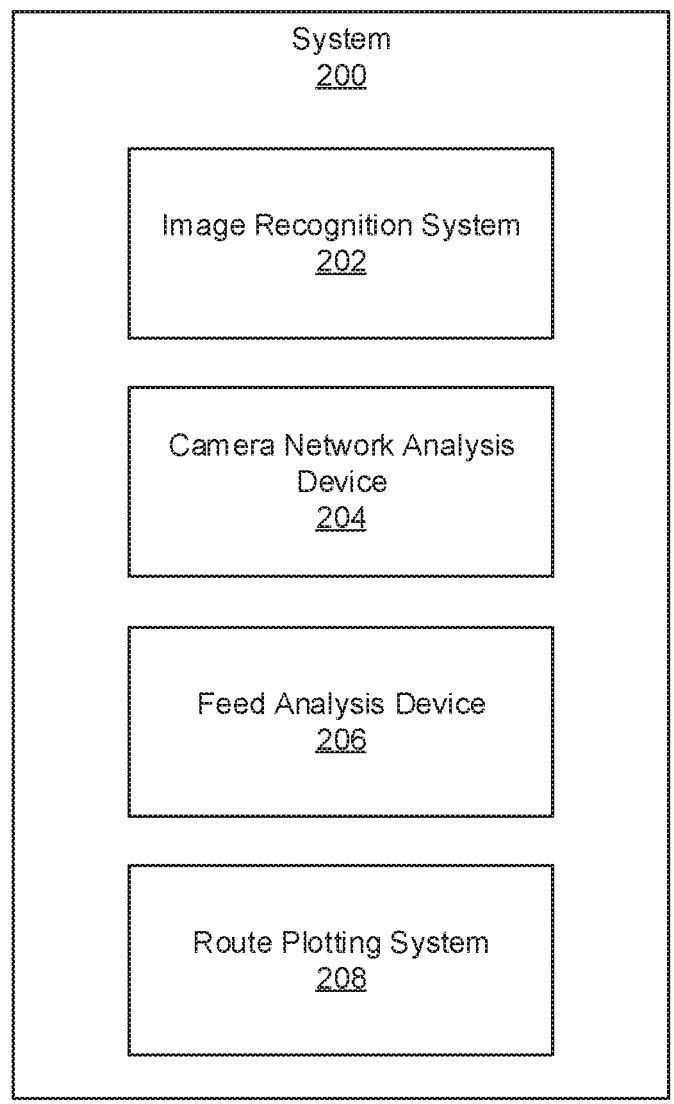
FIG. 2 depicts a system for tracking an object of interest, according to an example of the principles described herein.

FIG. 2 depicts a system (200) for tracking an object of interest, according to an example of the principles described herein. To achieve its desired functionality, the system (200) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. In another example, one processor may execute the designated function of each of the components.

The system (200) includes an image recognition system (202) to, for camera feeds received from cameras in a network, identify potential objects of interest from associated camera feeds. Such an image recognition system (202) may employ facial recognition. As a particular example, the image recognition system (202) may extract landmarks from an image of a subject. Examples of such landmarks may include relative position, size, and/or shape of eyes, nose, cheekbones, and jaw or other facial features. In another example, the image recognition system (202) may be able to extract non-facial landmarks such as a color of a vehicle, or a license plate of a vehicle. This information may be stored and associated with a particular object of interest in the camera feed. As described above, these characteristics of the objects of interest may be compared against characteristics of objects detected by other cameras to determine if there is a match. If there is a match and the compared feeds are adjacent one another along a particular roadway/pathway, it is indicative that the matched object traveled from one location to the other, a direction of travel which may be determined based on time stamps associated with the capture of the object of interest. In some examples, the image recognition system (200) includes image recognition devices integrated with respective cameras. That is, the computer code to perform vehicle, human, or other object recognition may be at the camera itself. In other examples, the image recognition system (202) is located at a remote location from the network of cameras, for example at a remote server. In this example, the image recognition system (202) may analyze feeds from multiple cameras.

The system (200) also includes a camera network analysis device (204) to identify, relative to a source camera, a number of adjacent cameras along possible travel routes. In this example, the camera network analysis device (204) may include a database that locates each camera in a camera network. Adjacent cameras may be identified based on their connection to each other along roadways. For example, an adjacent camera may be identified as a camera for which there is a path to a source camera, without any cameras along the path between the two. In another example, an adjacent camera may be identified as one within a smallest radius without other cameras having a smaller radius. Such a camera network analysis device (204) accordingly may have a database of cameras in a camera network and/or a database of roadways or other paths between cameras in the network.

As described above, the camera network analysis device (204) may be integrated with cameras of the network, such that each camera has stored information indicating which cameras are its adjacent cameras using either of the criteria described above (i.e., closest along roadways, closest in a line-of-sight measurement system).

The system (200) also includes a feed analysis device (206) to, for each adjacent camera, detect whether any of the multiple potential objects of interest (from the source camera) are identified in an associated camera feed. That is, characteristics for potential objects of interest identified in the source camera feed are compared against characteristics for objects detected in adjacent camera feeds. Any match indicates that an associated object of interest traveled between the two associated cameras.

A route plotting system (208) plots a likely route of multiple objects of interest by preventing analysis of downstream camera feeds when an upstream camera does not include any potential object of interest. For example, returning to the example above where a second camera did not detect any potential object of interest. In this example, cameras downstream of just the second camera are eliminated from analysis as the fact that no object of interest was detected at the second camera strongly suggests that no object of interest would be detected at cameras downstream of just that second camera. An example of the elimination of downstream cameras is provided below in connection with FIGS. 4A-4E. Thus, the system (200) provides for an effective method of pruning a search area for an object of interest by eliminating those areas where the object of interest is least likely to be.

Figure 3:
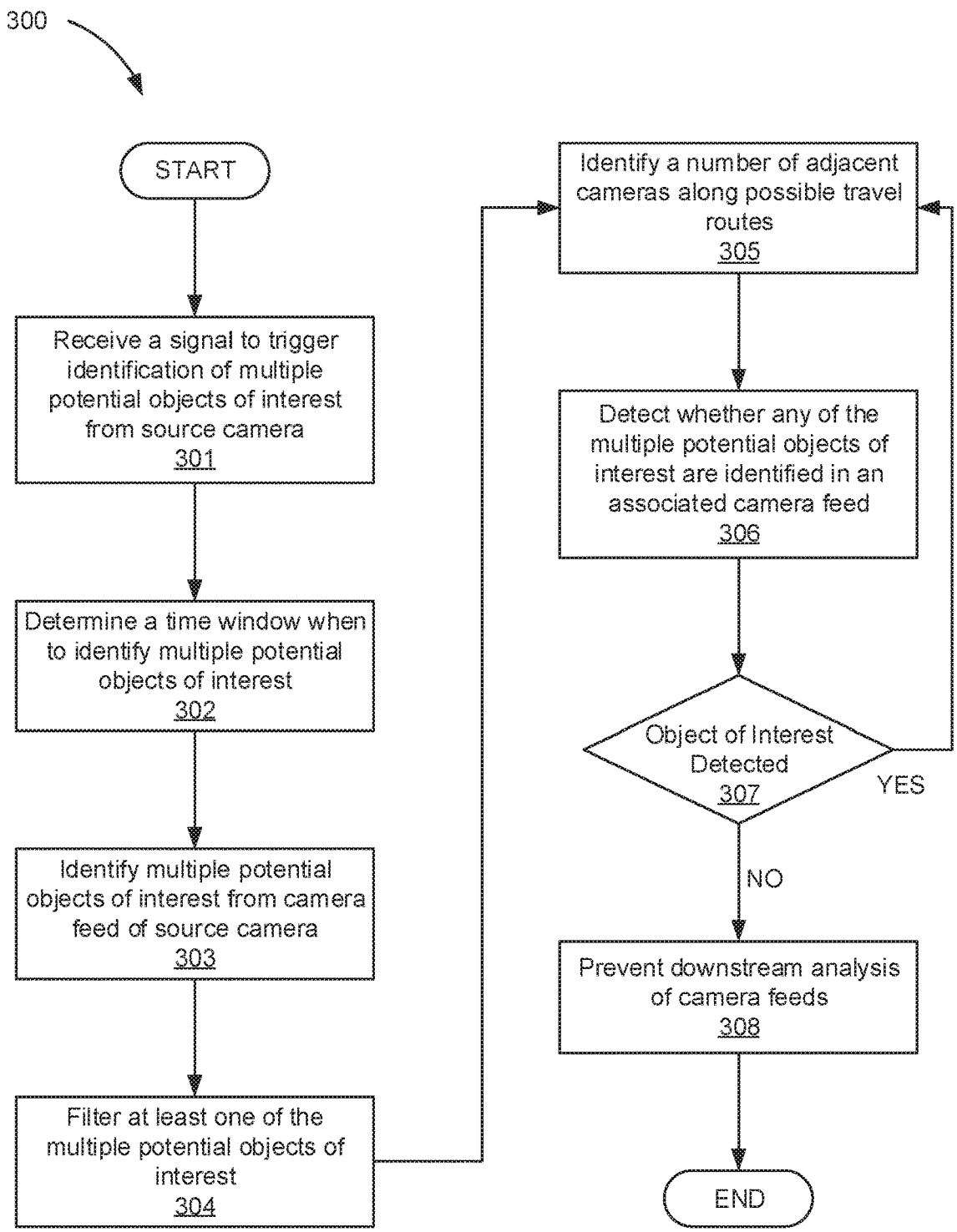
FIG. 3 depicts a flowchart of a method for tracking an object of interest, according to another example of principles described herein.

FIG. 3 depicts a flowchart of a method (300) for tracking an object of interest, according to another example of principles described herein. According to the method (300), a signal is received (block 301) that triggers identification of multiple potential objects of interest from the source camera. For example, a user may report or receive a report that an object of interest, such as a person or a vehicle, has gone missing and may initiate the system (FIG. 2, 200) analysis. In another example, the signal may be an alarm or other automated event that automatically triggers activation of the system (FIG. 2, 200).

Following such a signal, a time window is determined (block 302) in which to identify multiple potential objects of interest from a camera feed. Such a window provides more opportunity to correctly identify an object of interest. That is, rather than just relying on camera feed from after a signal is received (block 301), camera feed from before the signal is received (block 301) may also be used to identify and properly track an object of interest. Also, such a time window may prevent extraneous camera feed analysis. That is, camera feed that is a threshold amount of time following reception of a signal may be irrelevant and may capture objects that are not of interest as it relates to the event that triggered the analysis. Accordingly, within this determined time window, multiple potential objects of interest are identified (block 303) from the camera feed of the source camera. This may be performed as described above in connection with FIG. 1.

As described above, the method (300) may also include filtering (block 304) at least one of the multiple potential objects of interest. For example, the image recognition system (FIG. 2, 202) may identify a dog or a public transit bus that passes by the source camera. Such objects may be filtered (block 304) as they may skew the route planning that is based on detected objects of interest.

A number of adjacent cameras are identified (block 305) and it is detected (block 306) whether any of the multiple objects of interest are identified in an associated camera feed of an adjacent camera. These operations may be performed as described above in connection with FIG. 1. If no object of interest from a source camera feed is identified in an adjacent camera feed (block 307, determination NO), analysis of downstream camera feeds is prevented (block 308) as described above in connection with FIG. 3.

By comparison, if an object of interest from a source camera feed is detected in an adjacent camera feed (block 307, determination YES), the process repeats. That is, for each camera where an object of interest from the source camera is detected, a second number of adjacent cameras is identified, the second number being adjacent to the camera which detected objects of interest from the root, or source camera. For each of the second number of adjacent cameras it is detected whether any of the multiple potential objects of interest are identified in an associated camera feed. Similarly, if no object of interest is detected, analysis of downstream cameras is prevented while if any of the multiple objects of interest are detected, analysis continues downstream. Thus, the present method (300) describes an iterative approach which sequentially considers whether a downstream camera has any object of interest identified from an upstream camera and continues downstream analysis if it does and prevents it if it does not. Thus, a route is identified of the different objects of interest away from a source location. In so doing, those routes that are unlikely, on account of them not having any of the identified source objects of interest, are not analyzed, thus conserving computing bandwidth, and leading to a more rapid and effective localization of a particular object of interest.

FIG. 4A-4E depict a visualization of a tracked object of interest, according to an example of the principles described herein. As described above, such a tracking begins at a source location indicated by the "X" in FIGS. 4A-4E. That is, camera feed from a source camera (412-1) is analyzed to determine multiple potential objects of interest that are captured by the source camera (412-1) during a determined time period before and/or after the signal to trigger the tracking is received. For simplicity, a single camera (412) is indicated with a reference number. In this scenario there may be a number of possible routes (410-1, 410-2, 410-3, 410-4), each leading towards a different adjacent camera (412).

Figure 4A:
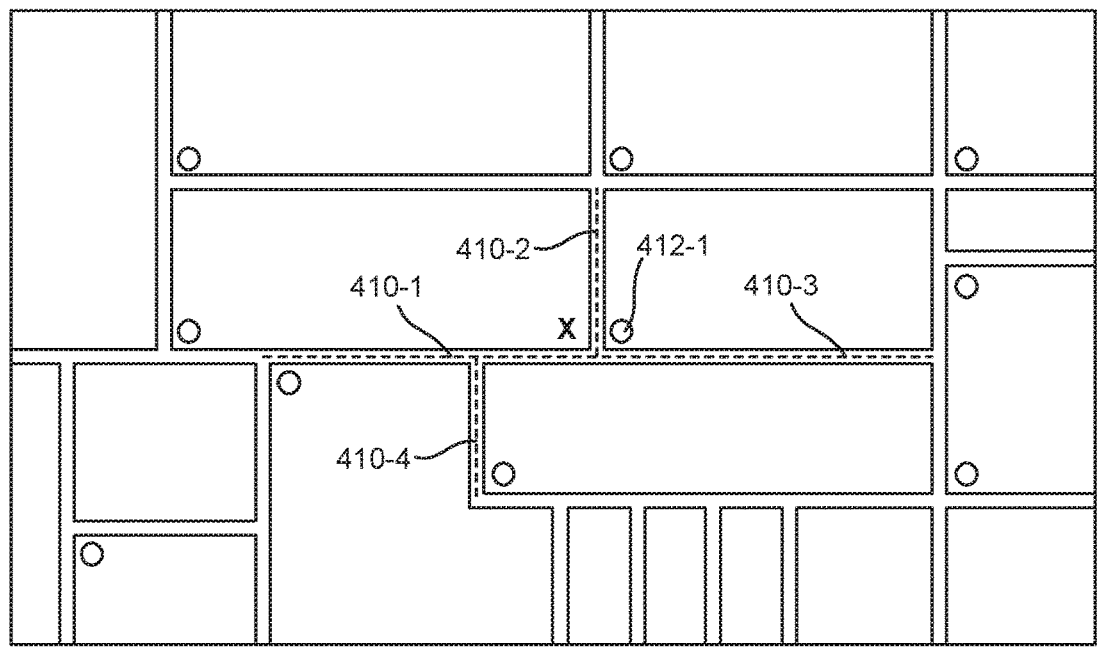
FIG. 4A-4E depict a visualization of a tracked object of interest, according to an example of the principles described herein.
Figure 4B:
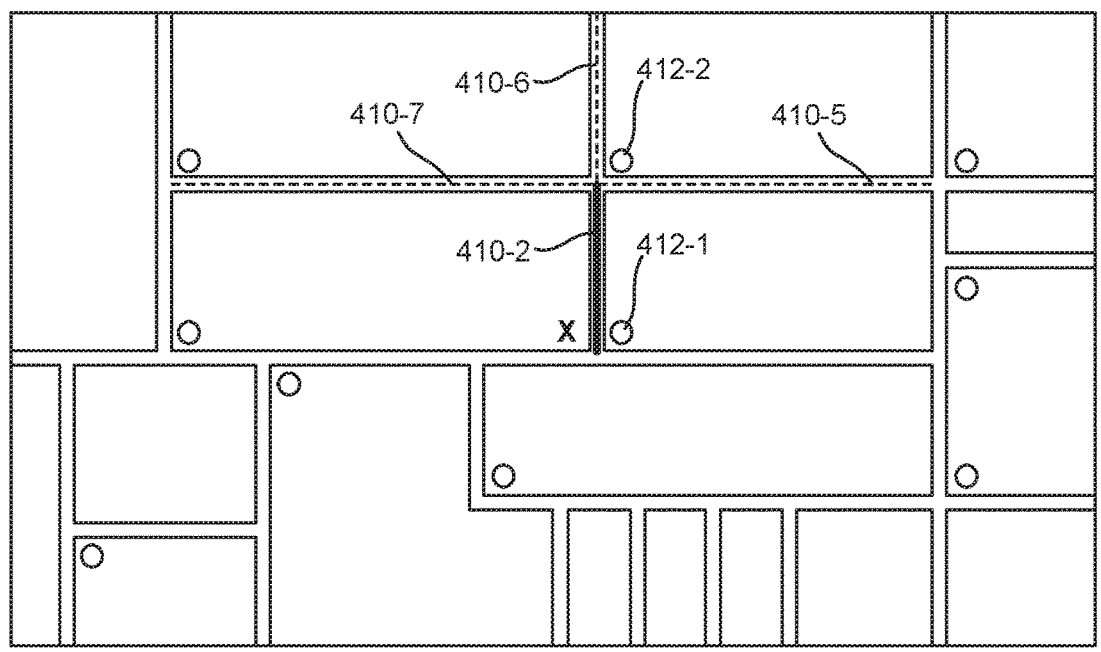

Feeds for each of these cameras (412) is analyzed to determine what objects are captured therein. As depicted in FIG. 4B, a second route (410-2) is identified as the route of the object of interest as a second camera (412-2) identified the object of interest. That is, objects of interest identified by the source camera (412-1) were identified by the second camera (412-2), but none of the other adjacent cameras in FIG. 4A that were associated with other possible routes (410-1, 410-3, 410-4).

Note that the camera feeds of adjacent cameras (412) may be similarly monitored during a predetermined window. That is, based on a known mode of transport (i.e., by foot, biking, car) it may be determined an amount of time it would take for the object of interest to reach the adjacent camera. Accordingly, based on the time window during which the source camera (412-1) feed is analyzed, the second camera (412-2) feed may be analyzed, which window for the second camera (412-2) is determined based on a speed of travel of the object of interest.

As depicted in FIG. 4B, a similar process is carried out where potential routes (410-5, 410-6, 410-7) leading away from the second camera (412-2) towards a second set of adjacent cameras (412) are determined, the feeds of which are analyzed to determine if the object of interest is captured thereon.

Figure 4C:
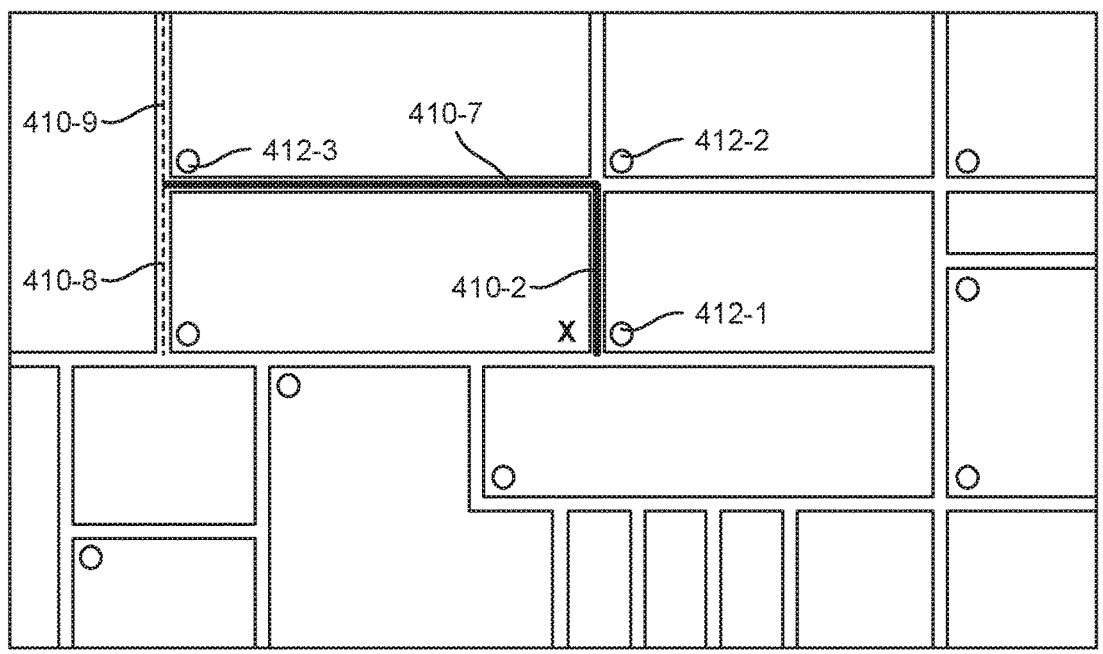

As depicted in FIG. 4C, a particular route (410-7) is identified as the route based on the object of interest showing up on the camera feed of the third camera (412-3). Again, a similar process is carried out where potential routes (410-8, 410-9) leading away from the third camera (412-3) towards another set of adjacent cameras (412) are determined, the feeds of which are analyzed to determine if the object of interest is captured thereon.

Figure 4D:
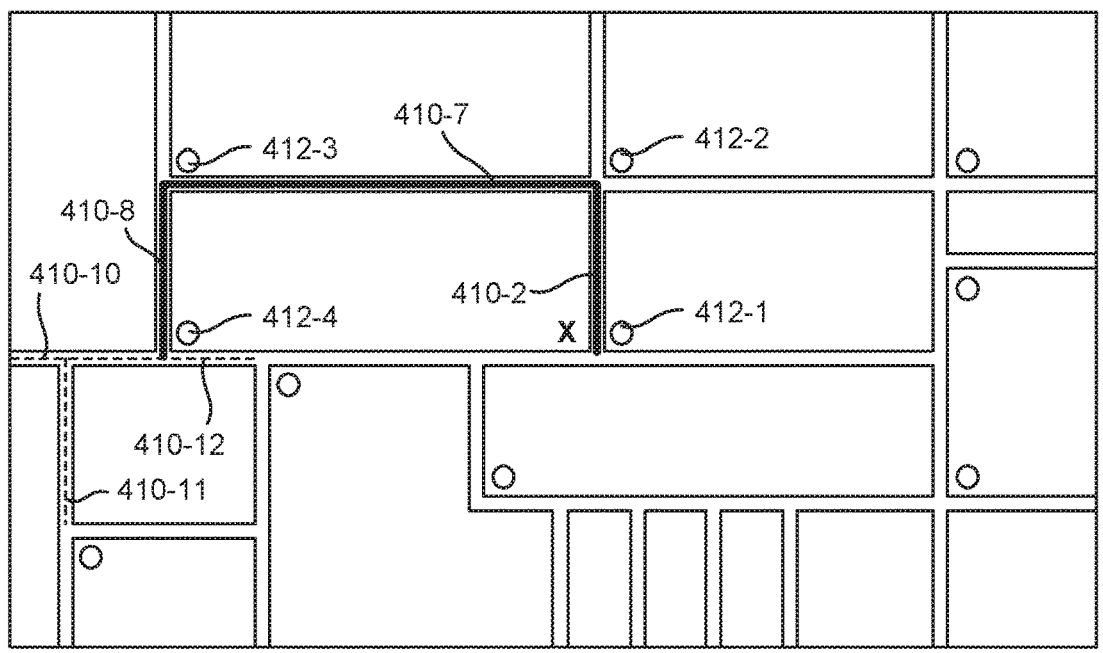

As depicted in FIG. 4D, a particular route (410-8) is identified as the route based on the object of interest showing up on the camera feed of the fourth camera (412-4). Again, a similar process is carried out where potential routes (410-10, 410-11, 410-12) leading away from the fourth camera (412-4) towards another set of adjacent cameras (412) are determined, the feeds of which are analyzed to determine if the object of interest is captured thereon.

Figure 4E:
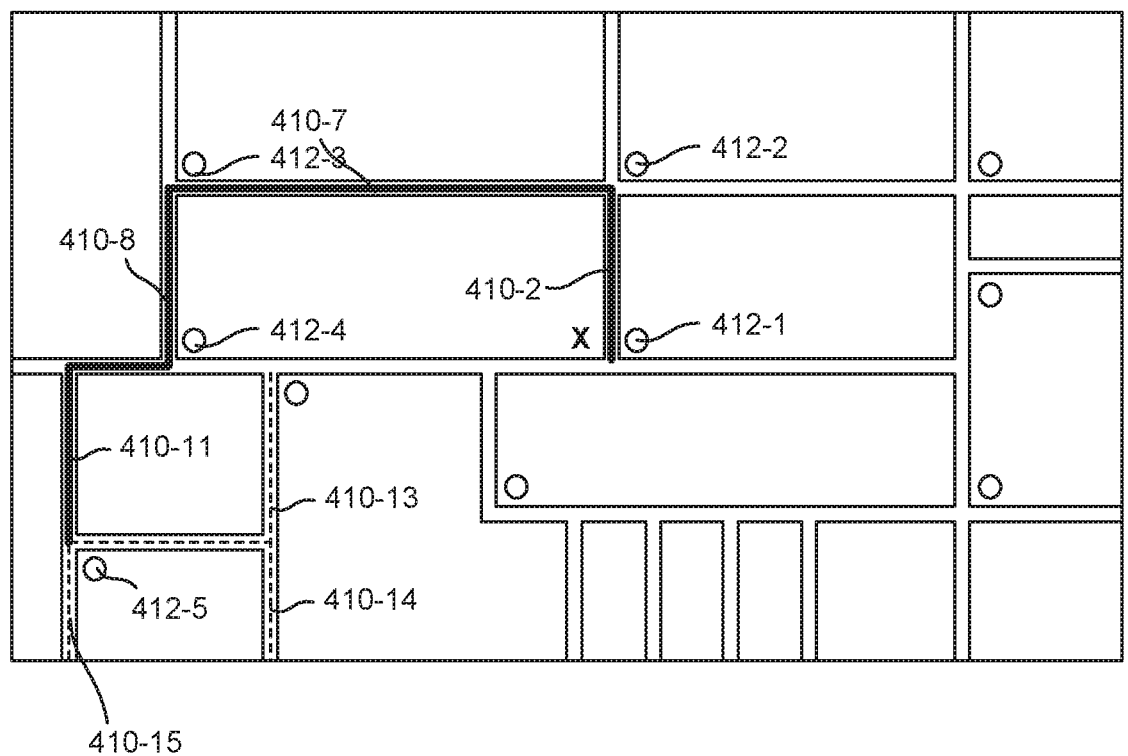

As depicted in FIG. 4E, a particular route (410-11) is identified as the route based on the object of interest showing up on the camera feed of the fifth camera (412-5). Again, a similar process is carried out where potential routes (410-13, 410-14, 410-15) leading away from the fifth camera (412-5) towards another set of adjacent cameras (412) are determined, the feeds of which are analyzed to determine if the object of interest is captured thereon.

Accordingly, a systematic process of analyzing just downstream cameras from cameras where the object of interest is detected provides for honing in on the likely route of any number of possible routes. That is, in a situation where a vehicle is missing, a task force may systematically search each possible route, regardless of a likelihood that the vehicle traveled in that direction. However, using the system (FIG. 2, 200) and methods described herein, a more effective, efficient and bandwidth conserving process is provided.

Note that in some examples, adjacent cameras (412) at the end of possible route segments may be cameras (412) previously analyzed. For example, in FIG. 4E, in addition to analyzing cameras at the ends of the potential routes (410-13, 410-14, 410-15), the fourth camera (412-4) feed at the end of the traveled route (410-11) may also be analyzed to track the object of interest in the event the object of interest back-tracked along the traveled path. That is, routes may be retraced, so at any location, the previous location may be one of the next possible locations.

Figure 5:
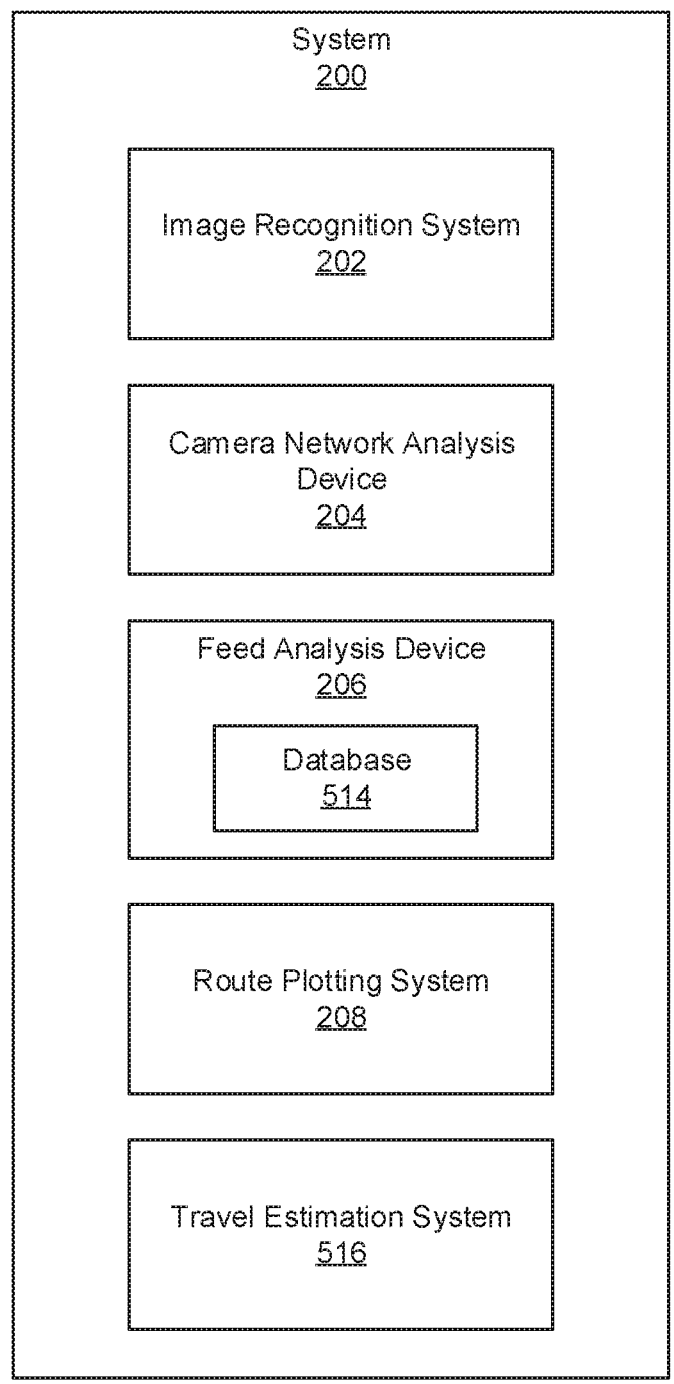
FIG. 5 depicts a system for tracking an object of interest, according to another example of the principles described herein.

FIG. 5 depicts a system (200) for tracking an object of interest, according to another example of the principles described herein. As described above in connection with FIG. 2, the system (200) may include an image recognition system (202), a camera network analysis device (204), and a route plotting system (208). In this example, the system (200) also includes the feed analysis device (206). In this particular example, the feed analysis device (206) includes a database (514) of known objects of interest. For example, rather than trying to identify what the object of interest is from any number of objects captured during a feed, a description of the object of interest, or a description of multiple objects of interest may be known. Accordingly, rather than using the camera feeds to determine from multiple objects, a subset of the objects that are of interest, the subset of objects that are of interest may be predetermined.

As a specific example, it may be determined, for example via user testimony, that a red truck is missing, which is indicated in the database (514). Accordingly, rather than analyzing each camera feed to determine routes of all vehicles, just a route of the red truck may be tracked. Thus, the database (514) is used to distinguish objects of interest from any other object that may be captured on the camera feeds.

The system (200) may also include a travel estimation system (516) to estimate a distance traveled by each object of interest. As described above, based on the estimated distance traveled, a time window may be identified during which feeds of adjacent cameras are analyzed to determine whether an object of interest has traveled by. For example, it may be that an object of interest is a person on a bike and that it would take approximately 2-3 minutes for the object of interest to go from a source camera to an adjacent camera. Accordingly, the adjacent camera may be analyzed during a window between 0-5 minutes after a time stamp associated with the object of interest showing up on the source camera feed.

Figure 6:
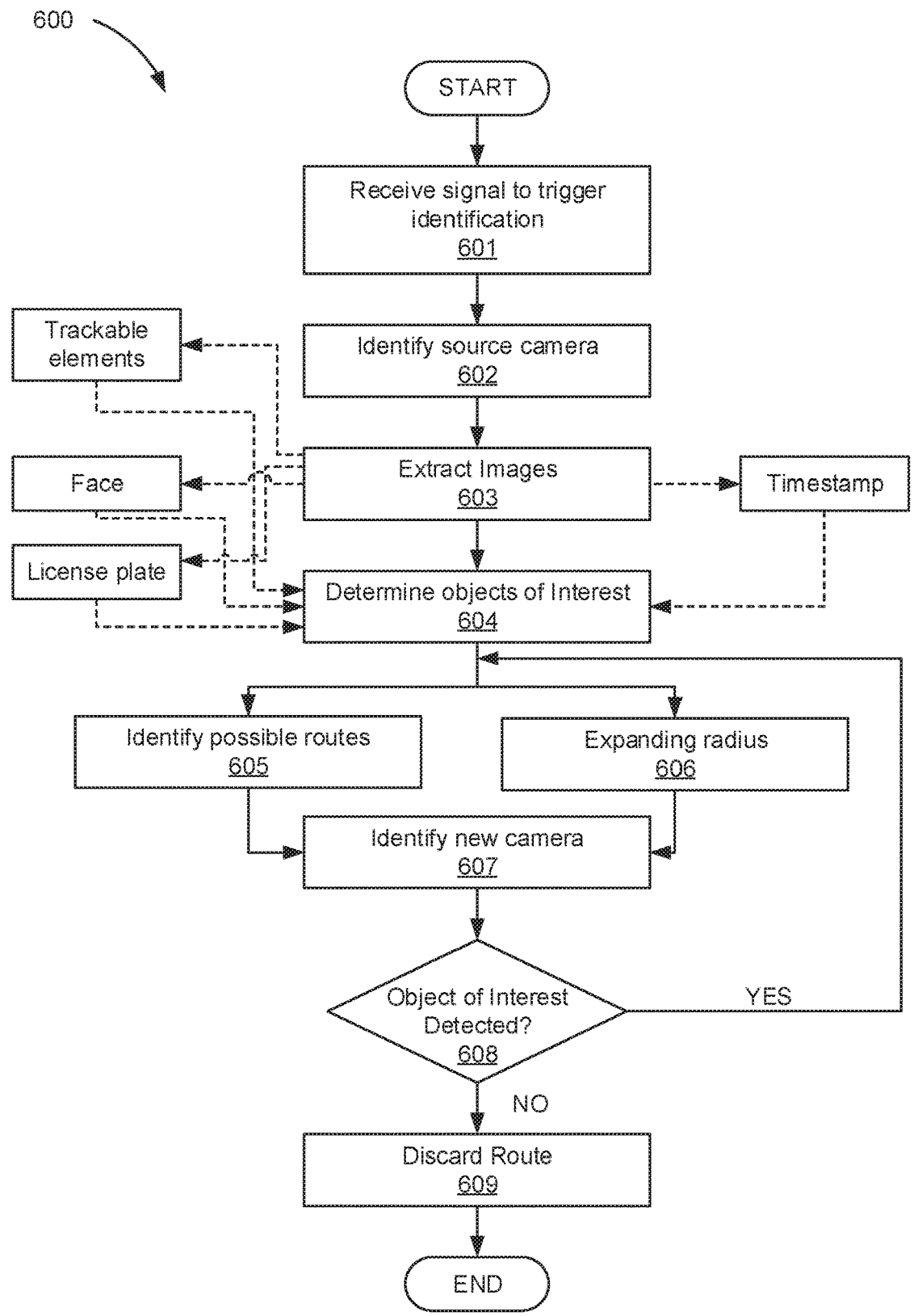
FIG. 6 depicts a flowchart of a method for tracking an object of interest, according to another example of principles described herein.

FIG. 6 depicts a flowchart of a method (600) for tracking an object of interest, according to another example of principles described herein. According to the method (600), a signal is received (block 601) which triggers identification and tracking of objects of interest. A source camera is identified (block 602) from which images are extracted (block 603). Various pieces of information may be extracted (block 603) during this process including a timestamp, facial information, a license plate and/or any other trackable characteristic. This information may be collected and analyzed to determine (block 604) of objects of interest.

As described above, possible routes may be identified (block 605) or a radius expanded (block 606), both of these operations to identify (block 607) a new, or next camera, along each of multiple possible travel routes. It is then determined (block 608) if one of the previously identified objects of interest is found on those next camera feeds. If not (block 608, determination NO), the associated route is discarded (block 609), thus eliminating from subsequent analysis a route for which it is unlikely the object of interest passed. If the object of interest is detected (block 608, determination YES), the process returns to either of the methods for identifying (block 607) a new camera and the process repeats until the route is determined or the object of interest is located and identified.

Figure 7:
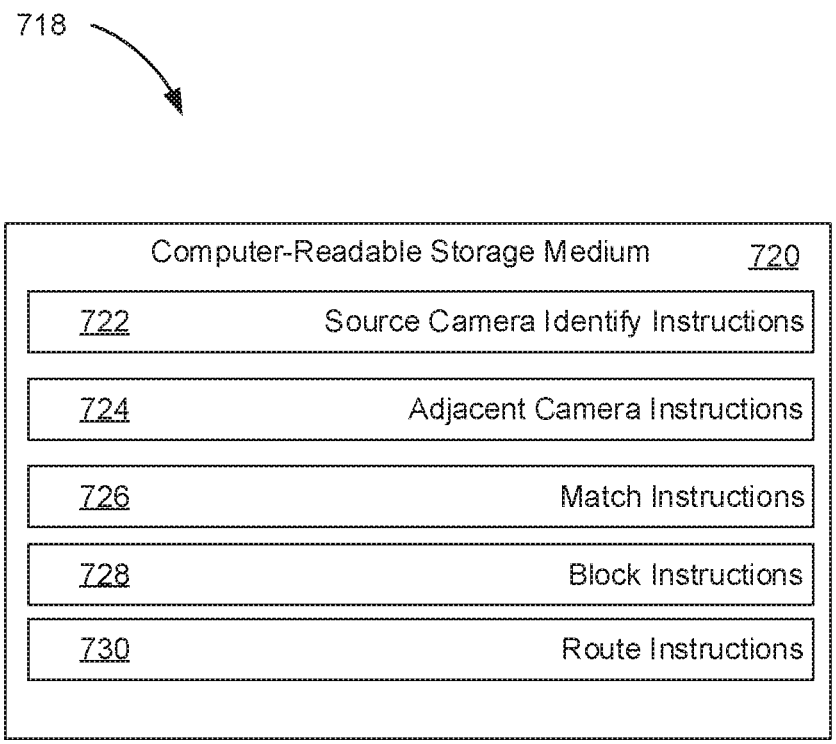
FIG. 7 depicts a computer program product with a computer readable storage medium for tracking an object of interest, according to an example of principles described herein.

FIG. 7 depicts a computer program product (718) with a computer readable storage medium (720) for tracking an object of interest, according to an example of principles described herein. To achieve its desired functionality, a computing system includes various hardware components. Specifically, a computing system includes a processor and a computer-readable storage medium (720). The computer-readable storage medium (720) is communicatively coupled to the processor. The computer-readable storage medium (720) includes a number of instructions (722, 724, 726, 728, 730) for performing a designated function. The computer-readable storage medium (720) causes the processor to execute the designated function of the instructions (722, 724, 726, 728, 730).

Referring to FIG. 7, source camera identify instructions (722), when executed by the processor, cause the processor to identify multiple potential objects of interest from a camera feed of a source camera. Adjacent camera instructions (724), when executed by the processor, may cause the processor to identify a number of adjacent cameras along possible travel routes. During a second iteration, the adjacent camera instructions (724) may also cause the processor to identify a second number of adjacent cameras, which second number are adjacent a first determined adjacent camera. For each adjacent camera and for each second adjacent camera, match instructions (726), when executed by the processor, may cause the processor to detect whether any of the multiple potential objects of interest are identified in an associated camera feed.

For each adjacent camera and second adjacent camera whose feed does not include any potential objects of interest, block instructions (728), when executed by the processor, may cause the processor to prevent downstream analysis of camera feeds to identify the multiple potential objects of interest. Route instructions (730), when executed by the processor, may cause the processor to plot a likely route of the multiple objects of interest.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining a time window when to identify multiple potential objects of interest from a camera feed of a source camera;
   identifying multiple potential objects of interest from the camera feed of the source camera;
   identifying a number of adjacent cameras along possible travel routes;
   for each adjacent camera, detecting whether any of the multiple potential objects of interest are identified in an associated camera feed; and
   for each adjacent camera whose feed does not include any potential object of interest, preventing analysis of downstream camera feeds during tracking of the multiple potential objects of interest.

2. The computer-implemented method of claim 1, further comprising for each adjacent camera whose feed does include a potential object of interest:
   identifying, for the adjacent camera, a second number of adjacent cameras;
   for each of the second number of adjacent cameras, detecting whether any of the multiple potential objects of interested are identified in an associated camera feed; and
   for each of the second number of adjacent cameras whose feed does not include any potential object of interest, preventing analysis of downstream camera feeds during tracking of the multiple potential objects of interest.

3. The computer-implemented method of claim 1, further comprising receiving a signal to trigger identification of multiple potential objects of interest from the source camera.

4. The computer-implemented method of claim 3, wherein the signal is an alarm.

5. The computer-implemented method of claim 1, wherein detecting whether any of the multiple potential objects of interest from the source camera are in an associated camera feed comprises comparing objects of interest from a source camera feed with objects of interest from an adjacent camera feed.

6. The computer-implemented method of claim 1, wherein identifying a number of adjacent cameras along possible travel routes comprises traversing paths to identify possible routes away from the source camera.

7. The computer-implemented method of claim 1, wherein identifying a number of adjacent cameras along possible travel routes comprises expanding a radius away from the source camera until an adjacent camera is detected.

8. The computer-implemented method of claim 1, further comprising filtering at least one of the multiple potential objects of interest.

9. The computer-implemented method of claim 1, wherein the source camera identifies the number of adjacent cameras along possible travel routes.

10. The computer-implemented method of claim 9, wherein the source camera sends a notification and data regarding the multiple potential objects of interest from the source camera to the number of adjacent cameras.

11. A system, comprising:
   an image recognition system to, for camera feeds received from cameras in a network, identify potential objects of interest from associated camera feeds;
   a camera network analysis device to identify, relative to a source camera, a number of adjacent cameras along possible travel routes;
   a travel estimation system to estimate a speed traveled by each potential object of interest;
   a feed analysis device to, for each adjacent camera, detect whether any of the multiple potential objects of interest are identified in an associated camera feed, wherein an adjacent camera is analyzed based on a window determined by the speed of the potential objects of interest; and
   a route plotting system to plot a likely route of the multiple objects of interest by preventing analysis of downstream camera feeds when an upstream camera does not include any potential object of interest.

12. The system of claim 11, wherein the image recognition system comprises image recognition devices integrated with a respective camera.

13. The system of claim 11, wherein the image recognition system:
   is located at a remote location from the network of cameras; and
   analyzes feeds from multiple cameras.

14. The system of claim 11, wherein the feed analysis device comprises a database of known objects of interest.

15. A computer program product for tracking an object of interest, the computer program product comprising a computer readable storage medium having program instructions embodied therewith, the program instructions executable by a processor, to cause the processor to:
   identify, by the processor, multiple potential objects of interest from a camera feed of a source camera;
   identify, by the processor, a number of adjacent cameras along possible travel routes, wherein the processor is to expand a radius away from the source camera until an adjacent camera is detected;
   for each adjacent camera, detect, by the processor, whether any of the multiple potential objects of interest are identified in an associated camera feed;

for each adjacent camera whose feed does not include any potential object of interest, prevent, by the processor, analysis of downstream camera feeds during tracking of the multiple potential objects of interest;

for each adjacent camera whose feed does include a potential object of interest, identify, by the processor, a second number of adjacent cameras;

for each of the second number of adjacent cameras, detect, by the processor, whether any of the multiple potential objects of interested are identified in an associated camera feed;

for each of the second number of adjacent cameras whose feed does not include any potential object of interest, prevent, by the processor, analysis of downstream camera feeds to identify the multiple potential objects of interest; and plot, by the processor, a likely route of the multiple objects of interest.

16. The computer program product of claim 15, wherein an object of interest comprises an individual.

17. The computer program product of claim 15, wherein an object of interest comprises a vehicle.

18. The computer program product of claim 15, wherein an adjacent camera comprises a camera previously analyzed.

* * * * *